(12) United States Patent
Love et al.

(10) Patent No.: US 7,873,010 B2
(45) Date of Patent: Jan. 18, 2011

(54) CONTROL SIGNALING RESOURCE ASSIGNMENT IN WIRELESS COMMUNICATION NETWORKS

(75) Inventors: Robert T. Love, Barrington, IL (US);
Dale G. Schwent, Schaumburg, IL (US);
David R. Wilson, Hainesville, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 680 days.

(21) Appl. No.: 11/682,947

(22) Filed: Mar. 7, 2007

(65) Prior Publication Data

US 2008/0219236 A1   Sep. 11, 2008

(51) Int. Cl.
*H04W 4/00* (2009.01)
*H04J 3/00* (2006.01)
*H04B 7/212* (2006.01)

(52) U.S. Cl. .................. 370/330; 370/329; 370/337; 370/341; 370/347

(58) Field of Classification Search .................. 370/208, 370/310, 319–322, 324, 326, 328–330, 332–338, 370/341–345, 347–350, 441–442, 437, 468, 370/477, 479; 455/418, 434, 450–451, 452.2, 455/464, 509, 517, 550.1, 556.2, 560–561, 455/562.1
See application file for complete search history.

(56) References Cited

U.S. PATENT DOCUMENTS

| | | | |
|---|---|---|---|
| 6,385,434 B1 * | 5/2002 | Chuprun et al. | 455/11.1 |
| 6,522,636 B1 * | 2/2003 | Hogberg et al. | 370/316 |
| 6,567,416 B1 * | 5/2003 | Chuah | 370/418 |
| 6,741,554 B2 * | 5/2004 | D'Amico et al. | 370/225 |
| 2002/0118666 A1 * | 8/2002 | Stanwood et al. | 370/345 |
| 2002/0119781 A1 * | 8/2002 | Li et al. | 455/450 |

OTHER PUBLICATIONS

Ericsson; "Summary of E-Mail Discussions on Control Signaling"; TSG-RAN WG1 #46BIS; R1-062874; Seoul, Korea; Oct. 9-13, 2006; 2 Pages.
Samsung; "Data and Control Multiplexing in DFT-S-OFDM"; 3GPP TSG RAN WG1 Meeting #42BIS; R1-051039; San Diego, USA; Oct. 10-14, 2005; 5 Pages.
R1-060882, TSG-RAN WG1 #44bis, "E-UTRA Uplink Control Signaling +TP", Motorola, Athens, Greece, Mar. 26-31, 2006, all pages.

* cited by examiner

*Primary Examiner*—Meless N Zewdu
(74) *Attorney, Agent, or Firm*—Roland K. Bowler, II

(57) ABSTRACT

A method in a wireless communication network scheduling entity including allocating time-frequency radio resources in a sub-frame to a particular wireless communication device, wherein the sub-frame has a time dimension and a frequency dimension spanning a spectrum allocation, and wherein the time-frequency radio resource allocation includes a contiguous set of control channel resources extending from at least one edge of the spectrum allocation toward a medial portion of the spectrum allocation.

24 Claims, 3 Drawing Sheets

CONTROL SIGNALING RESOURCE ASSIGNMENT IN WIRELESS COMMUNICATION NETWORKS

FIELD OF THE DISCLOSURE

The present disclosure relates generally to wireless communications and, more specifically, to radio resource assignment control signaling in wireless communication networks.

BACKGROUND

For the uplink of future broadband systems, single-carrier based approaches with orthogonal frequency division are of interest. These approaches, particularly Interleaved Frequency Division Multiple Access (IFDMA) and its frequency-domain related variant known as DFT-Spread-OFDM (DFT-SOFDM), are attractive because of their low peak-to-average power ratio (PAPR), frequency domain orthogonality among users, and low-complexity frequency domain equalization.

Out of band emissions require de-rating of the maximum transmit power levels of wireless terminals to meet adjacent channel leakage ratio (ACLR) requirements, depending on the occupied bandwidth of the assigned channel and its location in the carrier band. Also, coverage for uplink control signaling such as ACK/NACK, CQI, and scheduling requests is limited when the assigned time-frequency resource is distributed mainly in the time domain (time division multiplexing) compared to a distribution in the frequency domain (frequency division multiplexing). DFT-SOFDM has thus emerged as a candidate for the Long Term Evolution of the $3^{rd}$ Generation Partnership Project (3GPP) wireless communication protocol, also known as Evolved Universal Terrestrial Radio Access (E-UTRA).

The various aspects, features and advantages of the disclosure will become more fully apparent to those having ordinary skill in the art upon careful consideration of the following Detailed Description thereof with the accompanying drawings described below. The drawings may have been simplified for clarity and are not necessarily drawn to scale.

DETAILED DESCRIPTION

Figure 1:
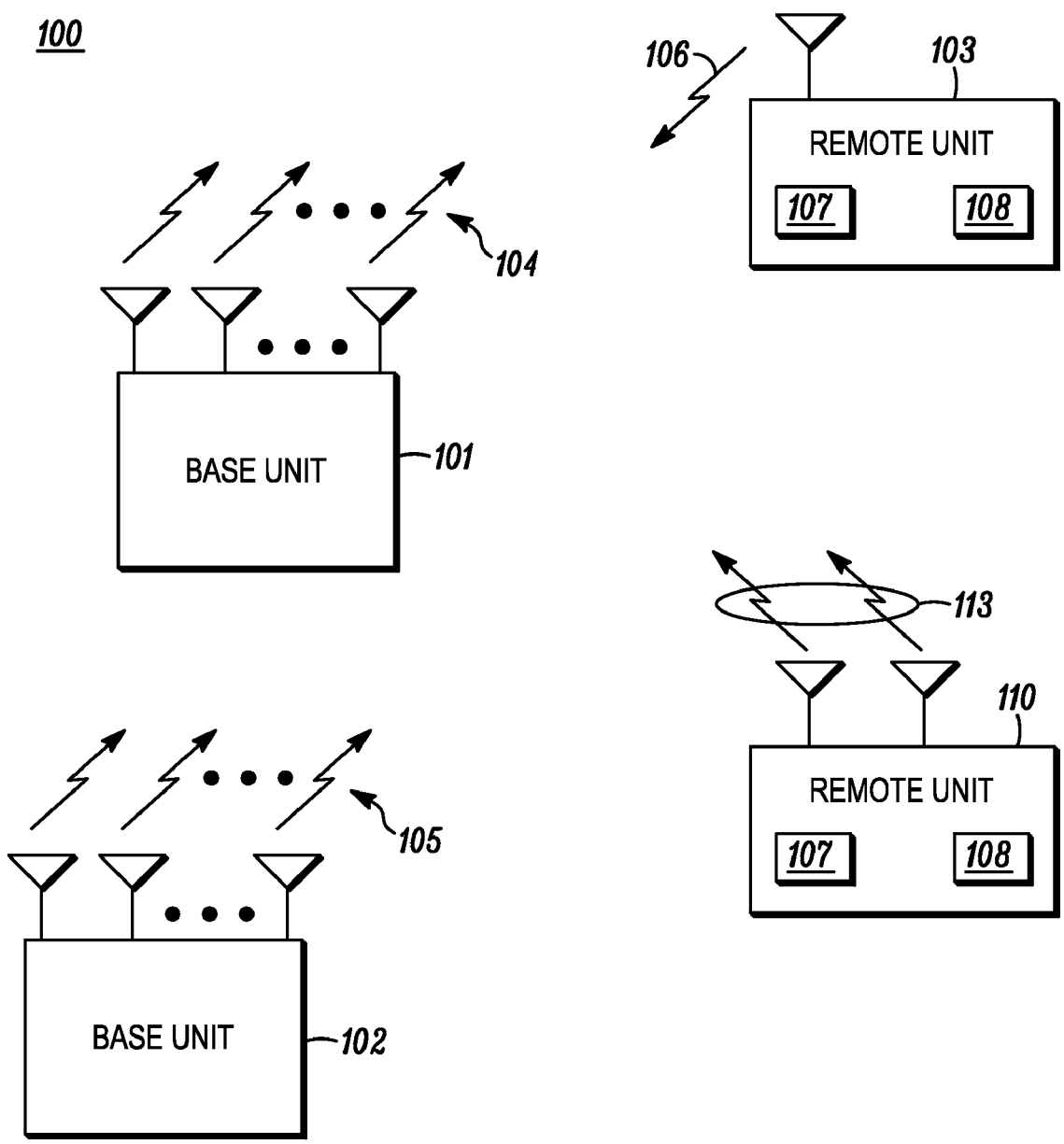
FIG. 1 illustrates a wireless communication network.

FIG. 1 illustrates a wireless communication system 100 comprising multiple cell serving base units forming a network distributed over a geographical region. A base unit may also be referred to as an access point, access terminal, Node-B, eNode-B, or by other terminology used in the art. The one or more base units 101 and 102 serve a number of remote units 103 and 110 within a serving area, for example, a cell, or within a sector thereof. The remote units may also be referred to as subscriber units, mobile stations, users, terminals, subscriber stations, user equipment (UE), user terminals, or by other terminology used in the art.

Generally, the base units 101 and 102 transmit downlink communication signals 104 and 105 to remote units on at least a portion of the same resources (time and/or frequency). Remote units 103 and 110 communicate with the one or more serving base units 101 and 102 via uplink communication signals 106 and 113. The one or more base units may comprise one or more transmitters and one or more receivers that serve the remote units. The remote units may also comprise one or more transmitters and one or more receivers.

In one embodiment, the communication system utilizes Orthogonal Frequency Division Multiple Access (OFDMA) or a next generation single-carrier (SC) based Frequency Division Multiple Access (FDMA) architecture for uplink transmissions, such as interleaved FDMA (IFDMA), Localized FDMA (LFDMA), DFT-spread OFDM (DFT-SOFDM) with IFDMA or LFDMA. Single-carrier based FDMA approaches are attractive for their improved performance when assessed using contemporary waveform quality metrics, for example, peak-to-average power ratio (PAPR) or the so-called cubic metric (CM). These metrics are good indicators of the power back-off or the power de-rating necessary to maintain linear power amplifier operation. In this context, "linear" generally refers to a specified and controllable level of distortion both within the signal bandwidth generally occupied by the desired waveform and in neighboring frequencies.

On top of the baseline transmission scheme, the architecture may also include the use of spreading techniques such as direct-sequence CDMA (DS-CDMA), multi-carrier CDMA (MC-CDMA), multi-carrier direct sequence CDMA (MC-DS-CDMA), Orthogonal Frequency and Code Division Multiplexing (OFCDM) with one or two dimensional spreading, or simpler time and frequency division multiplexing/multiple access techniques. CDM is used for ACK/NACK information sent in the downlink control region. CDM is also used for ACK/NACK and CQI information sent in the uplink control region.

Generally, the network base units communicate with remote units to perform functions such as scheduling the remote units to receive or transmit data using available radio resources. The base units each include a scheduler for scheduling and allocating resources to the remote units, for example, in corresponding cellular areas. In multiple access schemes such as those based on OFDM systems or OFDM-like systems such as DFT-SOFDM and IFDMA, scheduling may be performed in the time and frequency dimensions using a Frequency Selective (FS) scheduler. In some embodiments, each remote unit may provide a per frequency band channel quality indicator (CQI) to the base unit scheduler to enable FS scheduling. The channel-coding rate and the modulation scheme, which may be different for different allocation portions of the sub-carrier resources, are also determined by the scheduler and may also depend on the reported CQI or other metric. Selection of the channel-coding rate and modulation scheme is also referred to as link adaptation.

Figure 2:
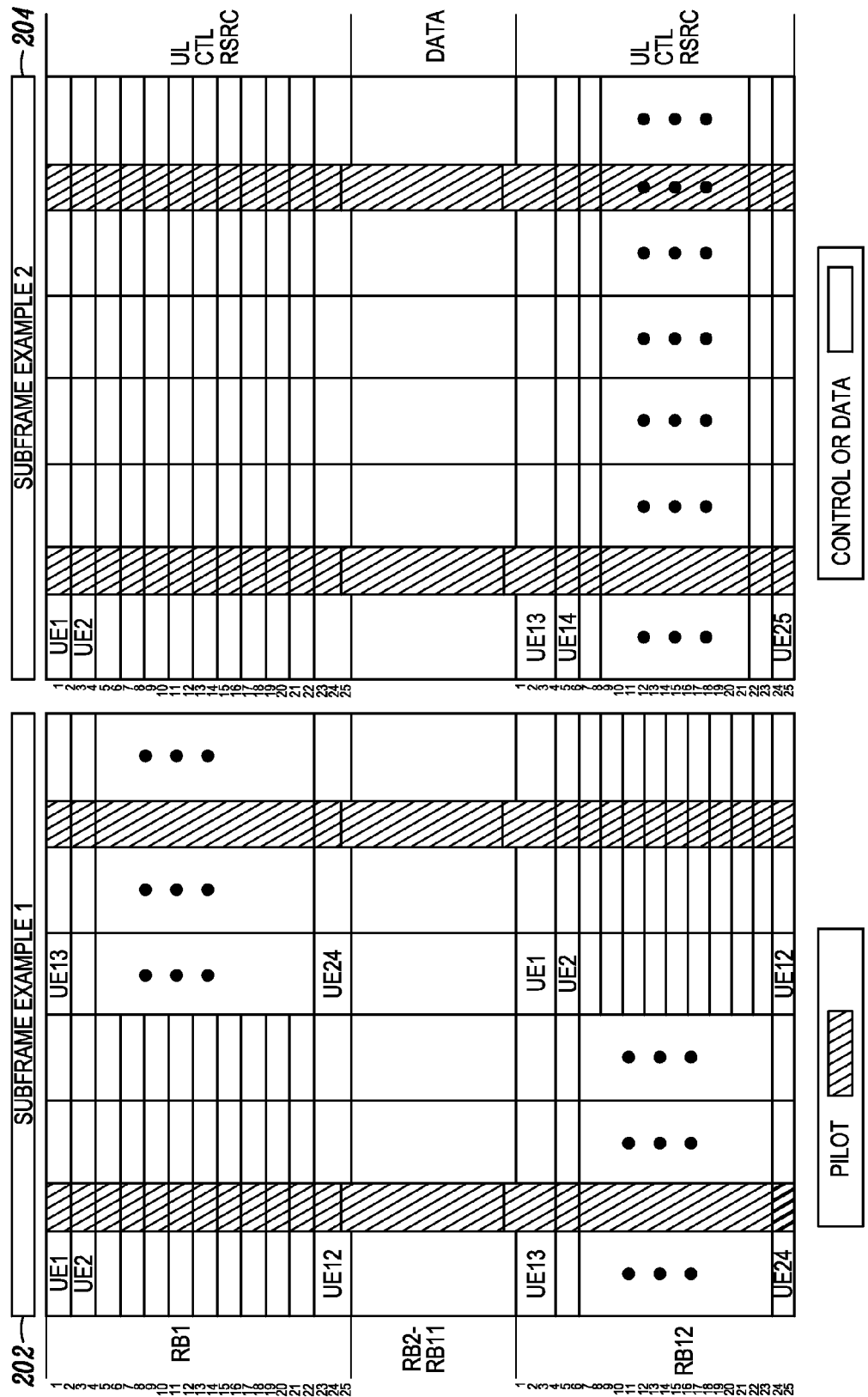
FIG. 2 illustrates first and second sub-frames having time-frequency resources.

FIG. 2 illustrates first and second sub-frames 202 and 204 that constitute a portion of a radio frame having two or more sub-frames. The sub-frames are divided into resource blocks having a specified time dimension and a frequency dimension. The sub-frames or regions (e.g. some resource blocks) of a sub-frame may also have a code dimension. In one embodiment, each sub-frame is divided into multiple time slots, for example, first and second time slots (Slot 1 & Slot 2) having equal non-overlapping time intervals in the time domain. In some applications, each frame corresponds to a transmission time interval (TTI). An exemplary TTI is 1 ms, wherein the TTI is segmented into two sub-frames each having a 0.5 ms temporal length or duration. In other embodiments, a single TTI may have a length 1 ms or 2 ms. In one embodiment, for example, a sub-frame might have a 1 ms duration and be composed of two slots of 0.5 ms each wherein each slot is composed of 7 DFT-SOFDM symbols. In the case of UMTS (Universal Mobile Telecommunications System), a TTI is defined as a time interval over which a transmission or transport block is transmitted. An alternate definition of TTI could be the length of transmission controlled by a single instance of control channel signaling. More generally, the time duration of the sub-frame and time slots, if any, depends upon the particular implementation, which may depend on a communication protocol.

Figure 3:
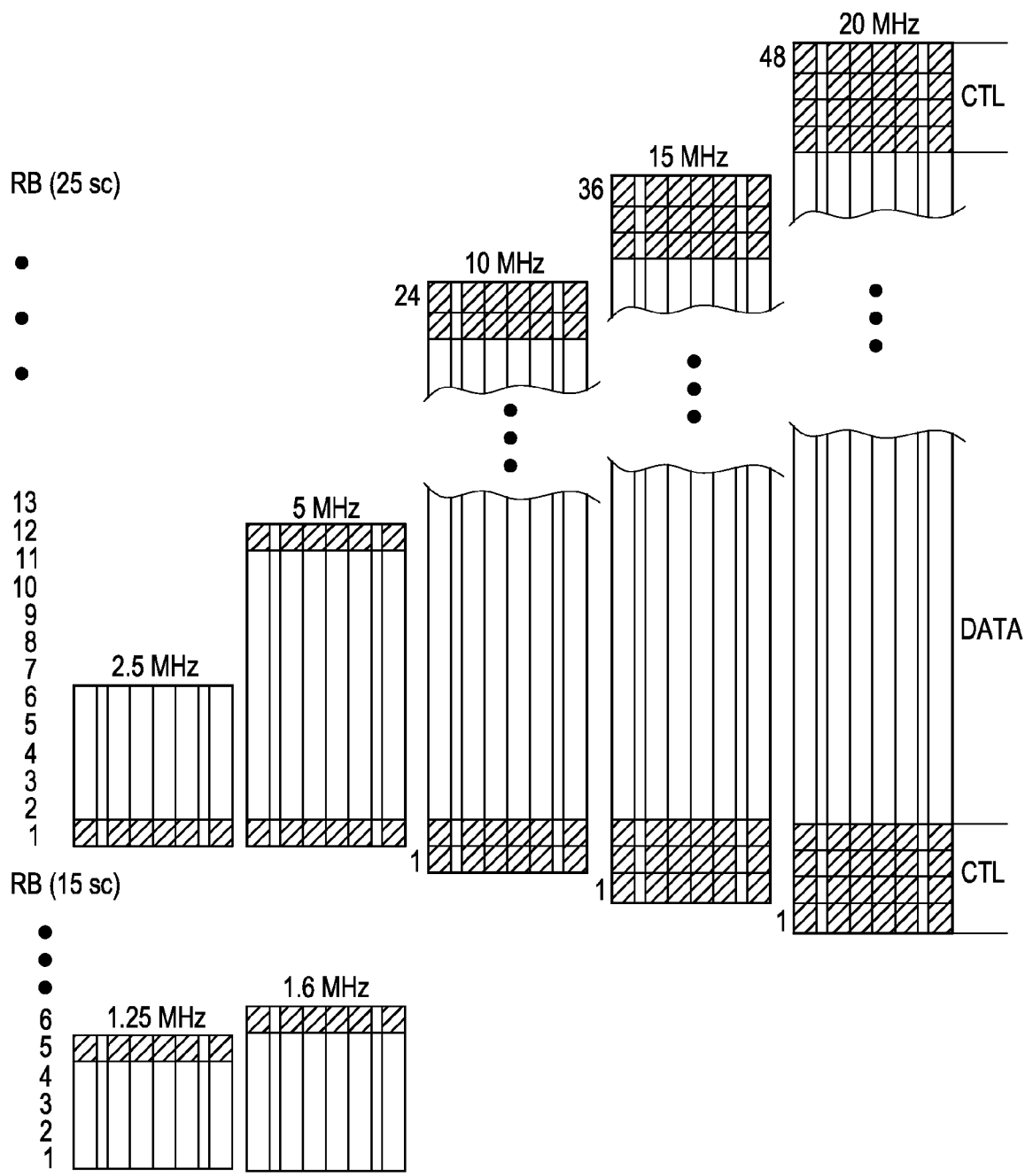
FIG. 3 illustrates sub-frames having different bandwidths.

In FIG. 2, the sub-frames are divided into resource blocks also having a specified frequency dimension. The resource blocks may thus be referred to as time-frequency resources. In FIG. 2, the frequency dimension of the sub-frame spans a spectrum allocation. Each resource, for example, a control channel resource, includes N frequency resources, for example, frequency sub-carriers. FIG. 3 illustrates multiple sub-frames having different spectrum allocations, for example, 1.25 MHz, 1.6 MHz, 2.5 MHz, 5 MHz, 10 MHz, 15 MHz and 20 MHz. Each sub-frame is divided into multiple resource blocks having a specified bandwidth.

In FIG. 2, in the time domain, each sub-frame includes 6 symbols, for example, DFT-SOFDM symbols, with long time durations also known as long blocks, which are suitable for data or for control channel information. There are also 2 shorter time duration symbols known as short blocks, which are typically used for pilot symbols, which are also referred to as reference symbols. In one embodiment, each long block is composed of 300 sub-carriers and each short block is composed of 150 sub-carriers. In other embodiments, there could be a different number of blocks and each block could be composed of a different number of sub-carriers. Each resource block includes one or more sub-carriers and can be defined to span 3 long blocks and a short block or it could be defined to span 6 long blocks and 2 short blocks. Given the latter definition, the span of 3 long blocks and a short block may be defined to be a slot, as illustrated in FIG. 2. In another embodiment, the resource blocks contain 25 sub-carriers for the long blocks and 12 or 13 sub-carriers for the short blocks.

In FIG. 2, the control region is contained in the resource blocks at the band edges RB1 and RB12 of each sub-frame. The other resource blocks RB2-11 are used for data, which may be multiplexed with control information. In FIG. 2, the short blocks or long blocks that do not contain parallel diagonal lines support data or control information although in the example, as already mentioned, the long blocks containing control information are only in RB1 and RB12. Also, in this example, only the short blocks have the parallel diagonal lines, which indicate that only short blocks are used as pilots. However, more generally, pilots could also be on long blocks and data could also be on short blocks. In another embodiment, the two short pilot blocks could be replaced by a single long pilot block.

In one embodiment, the scheduling entity allocates time-frequency radio resources in a sub-frame to wireless communication devices, for example, to the remote units 103 and 110 in FIG. 1. In FIG. 2, the scheduler assigns resource blocks to different remote units, for example, UE1, UE2, etc. In one particular, implementation, the time-frequency radio resources include a set of control channel resources extending contiguously from at least one edge of the spectrum allocation toward a medial portion of the spectrum allocation, wherein at least the medial portion of the spectrum allocation includes non-control channel resources, for example, data blocks. In other embodiments, the time-frequency radio resources include a set of control channel resources extending from first and second opposite edges of the spectrum allocation toward the medial portion of the spectrum allocation. The control channel resources comprise one or more sub-carriers, which may constitute a resource block.

In some implementations, the data blocks in the medial portion of the spectrum allocation may include control information, for example, by multiplexing the data and control information. Generally, when time multiplexing data and control information, the control information can be sent "in-band" or "out-of-band" in a primarily uplink data transmission. For example, when sending control information "in-band" with the data, the data and control information are coded together, for example, during DFT-SOFDM waveform generation before a DFT pre-coder. Alternatively, when the control information is "out-of-band", the control information is "piggy-backed" by puncturing a coded data block.

In FIG. 3, the first resource block "1" in the time domain of each sub-frame is dedicated to control channel resources (Ctl). In the 2.5 MHz band allocation, the resource block "1" extending from one edge of the spectrum allocation is dedicated to control channel resources. In the 5 MHz band allocation, resource blocks "1" and "12" extending from opposite edges of the spectrum allocation are dedicated to control channel resources. In the 10 MHz band allocation, resource blocks "1" and "2" on one side of the spectrum allocation and resource blocks "23" and "24" on the opposite side of the spectrum allocation are dedicated to control channel resources. The control channel resource blocks extending from one or more edges of the spectrum allocation provide a guard band effect.

In one application, the scheduler allocates a control channel resource within a contiguous set of control channel resources extending from the not more than one edge of the spectrum allocation to a particular wireless communication device for a full duration of the sub-frame.

In the second sub-frame of FIG. 2, for example, uplink (UL) control channel resources located in the first resource block (RB1) extending from one edge of the spectrum allocation are assigned to UE1 for the full duration of the sub-frame. In one exemplary embodiment, the uplink (UL) control channel resources comprise two 15 kHz sub-carriers in each of the 6 long blocks for data and a 30 kHz sub-carrier in each of the two short blocks for the pilot channel. Control channel resources are also allocated as UL control channel resources to remote units (UE2-UE12) for the duration of the sub-frame. Similarly, resources extending contiguously from an opposite edge of the spectrum allocation in the second sub-frame 204 are allocated as UL control channel resources to other remote units (UE13-UE25) for the duration of the sub-frame. These uplink (UL) control channel resources may comprise two 15 kHz sub-carriers in each of the 6 long blocks for data and a 30 kHz sub-carrier in each of the two short blocks for the pilot channel.

In another application, the scheduler allocates first and second control channel resources within contiguous sets of control channel resources extending from corresponding first and second opposite edges of the sub-frame spectrum allocation, wherein the first and second control channel resource allocations do not overlap in time. Such an allocation provides frequency diversity. As in the example above, at least the medial portion of the spectrum allocation includes non-control channel resources, for example, data blocks. In some implementations, the data blocks in the medial portion of the spectrum allocation also include control information. In some implementations, the contiguous sets of control channel resources extending from corresponding first and second opposite edges of the sub-frame spectrum allocations also have a code dimension.

In FIG. 2, the first sub-frame 202 is divided into first and second slots (Slot 1 & Slot 2) of 0.25 ms duration each. In sub-frame 202, UE2 is only allocated resources in RB1 in the time duration spanning 3 long blocks and a single short block (in Slot 1). UE2 is not allocated resources in RB1 in Slot 2. In the following time duration spanning 3 long blocks and a short block (Slot 2), UE2 is allocated resources in RB12. UE2 is only allocated resources in Slot 1 in RB1 and resources in Slot 2 in RB12 thus providing frequency diversity while preserving the single carrier waveform. Hence, a minimum allocation of control resources would be reduced to only Slot 1 of RB1 and Slot 2 of RB12. In FIG. 2, using this frequency diversity allocation, each sub-frame supports allocating control information to 12 UEs, provided that only a single RB slot at one edge of the carrier band and a single RB slot in the second half of the RB at the other edge of the carrier band are allocated to each UE. RB1 in Slot 2 and RB12 in Slot 1 could also be used for data in the event that these resource blocks are not required to allocate control information to other UEs. In some implementations the control resource (a slot of RB1 or RB12) has a code dimension such that each control allocation corresponds to one of M orthogonal codes. Each orthogonal code spans the time and frequency components of the control resource. Given not more than M UEs are each assigned a different orthogonal code then each UE can simultaneously transmit its control information using the assigned control resource.

In one embodiment, in Slot 1, two 15 kHz sub-carriers in each of the 6 long blocks for data and a 30 kHz sub-carrier in each of 2 short blocks for pilot located in the first resource block (RB1) extending contiguously from the first edge of the spectrum allocation are allocated to UE1. In this embodiment the slots are 0.5 ms in duration. In Slot 2, two 15 kHz sub-carriers in each of the 6 long blocks for data and a 30 kHz sub-carrier in each of 2 short blocks for the pilot channel located in the last resource block (RB12) extending contiguously from the second, opposite edge of the spectrum allocation of the second slot are also allocated to UE1. Other remote units are also allocated frequency diverse control channel resources in the first sub-frame 202. For example, in the first slot, control channel resources spanning 15 kHz sub-carriers 3 and 4 of the data long blocks and a 30 kHz sub-carrier for the pilot short block in the first resource block (RB1) extending contiguously from the first edge of the spectrum allocation are allocated to UE2, and control channel resources spanning 15 kHz sub-carriers 4 and 5 of the data long blocks and a 30 kHz sub-carrier for the pilot short block in the first resource block (RB12) extending contiguously from the second, opposite edge of the spectrum allocation of the second slot are also allocated to UE2.

In FIG. 2, in the first and second sub-frames 202 and 204, the medial portion of spectrum allocations is used primarily for data resource allocation, although medial portions of the allocation could also be used for control channel resource allocation as discussed. Allocation of control channels with their small occupied bandwidth to carrier band edge resource blocks reduces out of carrier band emissions cause by data resource allocations on inner band resource blocks. Allocation of control channels with their small occupied bandwidth to carrier band edge resource blocks also maximizes the frequency diversity benefit for frequency diverse control channel allocations. Allocation of control resource blocks, that are not combined with data, in the medial portions of the spectrum allocations restrict the achievable peak data rate since data user allocations are restricted to resource blocks on one side or the other of the control resource block in order to preserve the single carrier nature of the DFT-SOFDM waveform.

In embodiments where control signaling, for example, data-associated and data-non-associated signaling, with its small occupied bandwidth are mapped to carrier band edge resource blocks, out of carrier band emissions from data resource allocations on inner band resource blocks are reduced and the frequency diversity benefit of frequency diverse control signalling allocations may be increased. This may also increase data transmission rates since control in the medial portion of the spectrum allocation restricts allocated data resources to be either above or below the control region (or between control regions) to maintain single carrier nature of uplink waveform. Segregating UE's by channel quality and mapping them to different sub-frames helps minimize a received signal dynamic range at the Node-B receiver and thereby minimizes required power control dynamic range and improves signaling reception by increasing Es/Ne where Ne is interference from adjacent out of channel emissions.

While the present disclosure and the best modes thereof have been described in a manner establishing possession by the inventors and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

What is claimed is:

1. A method in a wireless communication network scheduling entity, the method comprising:
   allocating time-frequency radio resources in a sub-frame to wireless communication devices,
   the sub-frame has a time dimension and a frequency dimension spanning a spectrum allocation,
   the time-frequency radio resources include a set of control channel resources extending from first and second opposite edges of the spectrum allocation toward a medial portion of the spectrum allocation,
   the medial portion of the spectrum allocation including non-control channel resources;
   the allocation is performed by the wireless communication network scheduling entity.

2. The method of claim 1, the time-frequency radio resources include a first contiguous set of control channel resources extending from a first edge of the spectrum allocation toward a medial portion of the spectrum allocation and a second contiguous set of control channel resources extending from a second edge of the spectrum allocation toward the medial portion of the spectrum allocation.

3. The method of claim 2, the contiguous set of control channel resources extending from the first and second opposite edges of the spectrum allocation for a full duration of the sub-frame.

4. The method of claim 2, the contiguous set of control channel resources extending from the first and second opposite edges of the spectrum allocation, the contiguous set of control channel resources extending from the first and second opposite edges do not span the entire time dimension of the sub-frame and do not overlap in the time dimension of the sub-frame.

5. The method of claim 1, allocating a control channel resource within a contiguous set of control channel resources extending from not more than one of the first and second opposite edges of the spectrum allocation to a particular wireless communication device.

6. The method of claim 5, allocating the control channel resource to the particular wireless communication device for a full duration of the sub-frame.

7. The method of claim 1, allocating a control channel resource within the set of control channel resources extending from the first and second edges of the spectrum allocation to a particular wireless communication device, the allocated control channel resource within the set of control channel resources extending from the first edge of the spectrum allocation not overlapping in time with the allocated control channel resource within the set of control channel resources extending from the second edge of the spectrum allocation.

8. The method of claim 4, allocating a control channel resource within the contiguous set of control channel resources extending from the first and second opposite edges of the spectrum allocation with the set on each edge not entirely spanning the sub-frame and not overlapping with each other to a particular wireless communication device.

9. The method of claim 1 further comprising receiving, at the wireless communication network scheduling entity, control information on the allocated time-frequency resources from the wireless communication devices.

10. The method of claim 1 further comprising assigning an orthogonal code to each of the wireless communication devices.

11. A method in a wireless communication network scheduling entity, the method comprising:
 allocating time-frequency radio resources in a sub-frame to a particular wireless communication device,
 wherein the sub-frame has a time dimension and a frequency dimension spanning a spectrum allocation, and wherein a plurality of sub-frames constitute a radio frame,
 the time-frequency radio resources within a contiguous set of control channel resources extending from at least one edge of the spectrum allocation toward a medial portion of the spectrum allocation;
 the allocation is performed by the wireless communication network scheduling entity.

12. The method of claim 11, the sub-frame includes a code dimension.

13. The method of claim 11, allocating a control channel resource within a contiguous set of control channel resources extending from not more than one edge of the spectrum allocation to the particular wireless communication device for a full duration of the sub-frame.

14. The method of claim 11, the sub-frame comprises first and second contiguous time slots that do not overlap in time, allocating the control channel resource for a full duration of the first and second time slots.

15. The method of claim 11,
 allocating a first control channel resource from a contiguous set of control channel resources extending from a first edge of the spectrum allocation to the particular wireless communication device,
 allocating a second control channel resource from a contiguous set of control channel resources extending from a second edge of the spectrum allocation to the particular wireless communication device, the first edge of the spectrum allocation opposite the second edge of the spectrum allocation,
 wherein the first control channel resource allocation does not overlap in time with the second control channel resource allocation.

16. The method of claim 15,
 the sub-frame comprises first and second contiguous time slots that do not overlap in time,
 allocating the first control channel resource for a full duration of the first time slot,
 allocating the second control channel resource for a full duration of second time slot.

17. The method of claim 11, the allocating time-frequency radio resources in the sub-frame includes allocating time-frequency radio resources in an uplink sub-frame.

18. The method of claim 11, the time-frequency radio resource allocation includes a contiguous set of control channel resources extending from at least one edge of the spectrum allocation toward a medial portion of the spectrum allocation, wherein each control channel resource includes N frequency resources.

19. The method of claim 11, allocating data resources in the medial portion of the spectrum allocation to the particular wireless communication terminal.

20. The method of claim 11, allocating data resources combined with control channel information in the medial portion of the spectrum allocation to the particular wireless communication terminal.

21. The method of claim 11, allocating a control channel resource within a contiguous set of control channel resources includes assigning to the particular wireless communication terminal one of M orthogonal codes.

22. The method of claim 21, wherein different wireless communication terminals each assigned a different orthogonal code simultaneously transmit their respective control information using the assigned control channel resource.

23. A method in a wireless communication terminal, the method comprising:
 receiving, at the terminal, a time-frequency radio resource allocation for a sub-frame,
 wherein the sub-frame has a time dimension and a frequency dimension spanning a spectrum allocation, and wherein a plurality of sub-frames constitute a radio frame,
 the time-frequency radio resource allocated within a contiguous set of control channel resources, the contiguous set of control channel resources extending from at least one edge of the spectrum allocation toward a medial portion of the spectrum allocation; and
 transmitting control information using the allocated time-frequency radio resource.

24. The method of claim 23 further comprising receiving an orthogonal code assignment wherein the orthogonal code spans the time-frequency resource allocation.

* * * * *